(12) United States Patent
Civitillo

(10) Patent No.: US 8,117,991 B1
(45) Date of Patent: Feb. 21, 2012

(54) REFRIGERATED PET WATER DISPENSING AND BOWL CLEANING SYSTEM

(76) Inventor: Sandra Civitillo, Hull, MA (US)

( * ) Notice: Subject to any disclaimer, the term of this patent is extended or adjusted under 35 U.S.C. 154(b) by 150 days.

(21) Appl. No.: 12/408,945

(22) Filed: Mar. 23, 2009

Related U.S. Application Data

(60) Provisional application No. 61/038,652, filed on Mar. 21, 2008.

(51) Int. Cl.
*A01K 7/00* (2006.01)
*A01K 7/02* (2006.01)

(52) U.S. Cl. .............................. 119/73; 119/72

(58) Field of Classification Search .................... 119/72, 119/72.5, 73, 74
See application file for complete search history.

(56) References Cited

U.S. PATENT DOCUMENTS

| | | | |
|---|---|---|---|
| 3,371,652 A * | 3/1968 | Louks et al. | 119/51.11 |
| 3,955,537 A * | 5/1976 | Yujiri | 119/51.13 |
| 4,256,054 A * | 3/1981 | Hitchcock | 119/51.11 |
| 6,619,232 B2 * | 9/2003 | Johnston et al. | 119/73 |
| 7,011,041 B1 * | 3/2006 | Bradley | 119/69.5 |
| 7,152,550 B2 * | 12/2006 | Walker | 119/51.5 |
| 7,380,517 B2 * | 6/2008 | Flowers et al. | 119/69.5 |
| 7,762,212 B2 * | 7/2010 | Drouillard et al. | 119/72 |
| 2003/0213437 A1 | 11/2003 | Norris | |
| 2008/0173246 A1 * | 7/2008 | Barkdoll | 119/74 |
| 2008/0190374 A1 * | 8/2008 | Farris | 119/74 |

* cited by examiner

*Primary Examiner* — David Parsley
(74) *Attorney, Agent, or Firm* — Thomas D. Foster

(57) ABSTRACT

A pet water dispenser having a system of water pumps to circulate water, a water bowl containing a temperature sensor to determine the temperature of the water in the bowl, an ultra violet light and a filter to purify and clean the circulating water, an in-line water heater and a thermoelectric cooling plate to keep the water at a desired temperature, water jets inside the bowl to spray water against the inside of the bowl to clean hair and debris from the bowl, a rotating drain disc in the bowl which periodically opens to permit emptying of old water from the water bowl and closes to permit filling of the bowl with fresh water, a digital controller to permit a pet owner to control the operation of the dispenser and the temperature of the water presented in the bowl to the pet.

7 Claims, 5 Drawing Sheets

US 8,117,991 B1

REFRIGERATED PET WATER DISPENSING AND BOWL CLEANING SYSTEM

CLAIM OF PRIORITY UNDER 35 U.S.C. §119

The present Application for patent claims priority to Provisional Application No. 61/038,652 entitled "Refrigerated Pet Water Dispensing and Bowl Cleaning System" filed Mar. 21, 2008, and hereby expressly incorporated by reference herein.

BACKGROUND OF THE INVENTION

Portions of the disclosure of this patent document may contain material that is subject to copyright protection. The copyright owner has no objection to the facsimile reproduction by anyone of the patent document or the patent disclosure as it appears in the Patent and Trademark Office file or records, but otherwise reserves all copyright rights whatsoever.

FIELD OF THE INVENTION

The present invention relates generally to the field of pet water dispensers, and more particularly to a refrigerated pet water dispensing and bowl cleaning system that provides cold water for pets at all times while keeping the bowl clean from hair and debris.

RELATED ART

Presently pet water dispensers provide fresh, cool water for only a short time after they are filed especially in hot sunny climates or the water freezes in cold icy climates. Furthermore, without constant attendance by the pet owner, present day pet water dispensers quickly accumulate pet hair, saliva and food particles that introduce bacteria into the water and contaminate the dispenser making the water unhealthy for the pet. Thus, there is a need for an automatic pet water dispenser that requires only occasional maintenance and refilling. More specifically, there is a need for an automatic pet water dispenser that once filed with fresh water automatically dispenses water into the bowl; automatically circulates fresh water through the cooling/heating system; automatically drains the bowl of water twice a day; automatically filters hair and debris through a screen that is removable to be cleaned manually; automatically pumps and sprays pressurized water against the bowl to clean any remaining residue in the bowl; automatically filters the water/residue through a filtration system; automatically regenerates the left-over water through a second filter; automatically re-circulates the filtered water with the fresh water; and automatically pumps cool fresh water back into the bowl. Furthermore, there is a need for an automatic pet water dispenser that slowly circulates the water 24 hours per day through a refrigeration unit to keep it at a constant cold temperature which is adjustable by a digital thermostat on a control panel.

SUMMARY OF THE INVENTION

To address one or more of the drawbacks of the prior art, the disclosed embodiment provides an automatic pet water dispenser that requires only occasional maintenance and refilling. More specifically, the disclosed embodiment provides an automatic pet water dispenser that once filed with fresh water automatically dispenses water into a bowl; automatically circulates fresh water through cooling/heating systems; automatically drains the bowl of water twice a day; automatically filters hair and debris through a screen that is removable to be cleaned manually; automatically pumps and sprays pressurized water against the bowl to clean any remaining residue in the bowl; automatically filters the water/residue through a filtration system; automatically regenerates the left-over water through a second filter; automatically re-circulates the filtered water with the fresh water; and automatically pumps cool fresh water back into the bowl. Furthermore, the disclosed embodiment provides an automatic pet water dispenser that slowly circulates the water 24 hours per day through a refrigeration unit to keep it at a constant cold temperature which is adjustable by a digital thermostat on the control panel which is located on the front of the unit.

Unless defined otherwise, all technical and scientific terms used herein have the same meaning as commonly understood by one of ordinary skill in the art to which the disclosed embodiments belong. Where a term is provided in the singular, the inventor also contemplates the plural of that term.

All headings are for the convenience of the reader and should not be used to limit the meaning of the text that follows the heading, unless so specified. Various changes and departures may be made to the disclosed embodiments without departing from the spirit and scope thereof. Accordingly, it is not intended that the disclosed embodiments be limited to any specifically described embodiment in the specification or as illustrated in the examples, but only as set forth in the claims.

Further objectives and advantages of the disclosed embodiments will become apparent when taken in conjunction with the accompanying drawings. To gain a full appreciation of the scope of the disclosed embodiments, it will be further recognized that various aspects of the disclosed embodiments can be combined to make desirable embodiments of the invention.

BRIEF DESCRIPTION OF THE DRAWINGS

The foregoing and other features and advantages of the invention will be apparent from the following, more particular description of a preferred embodiment of the invention, as illustrated in the accompanying drawings wherein like reference numbers generally indicate identical, functionally similar, and/or structurally similar elements. The left most digits in the corresponding reference number indicate the drawing in which an element first appears.

DETAILED DESCRIPTION OF AN EXEMPLARY EMBODIMENT OF THE PRESENT INVENTION

Figure 1:
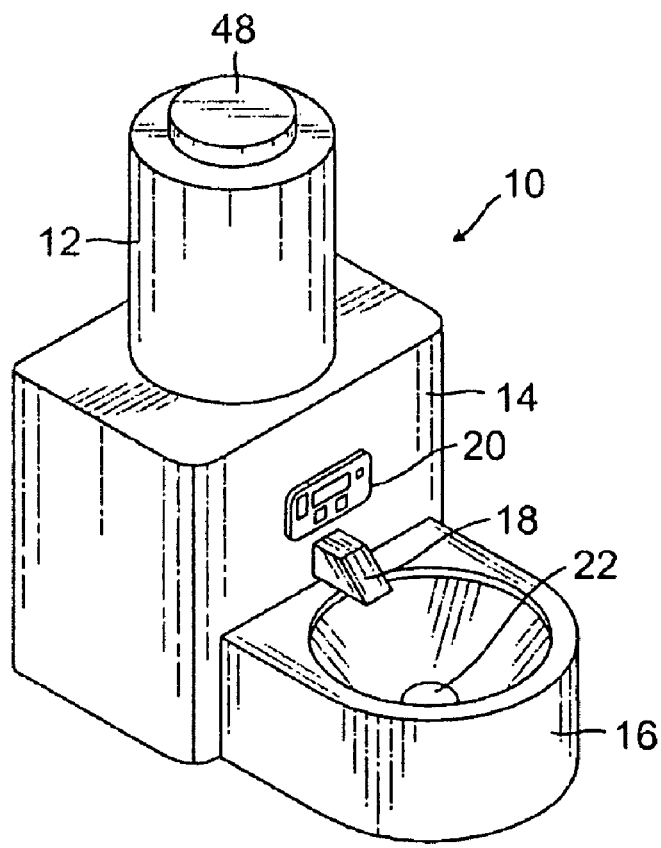
FIG. 1 illustrates a perspective view of the overall invention showing the removable cover, water tank, housing assembly, digital display/controller, water fall, water bowl and drain.
Figure 2:
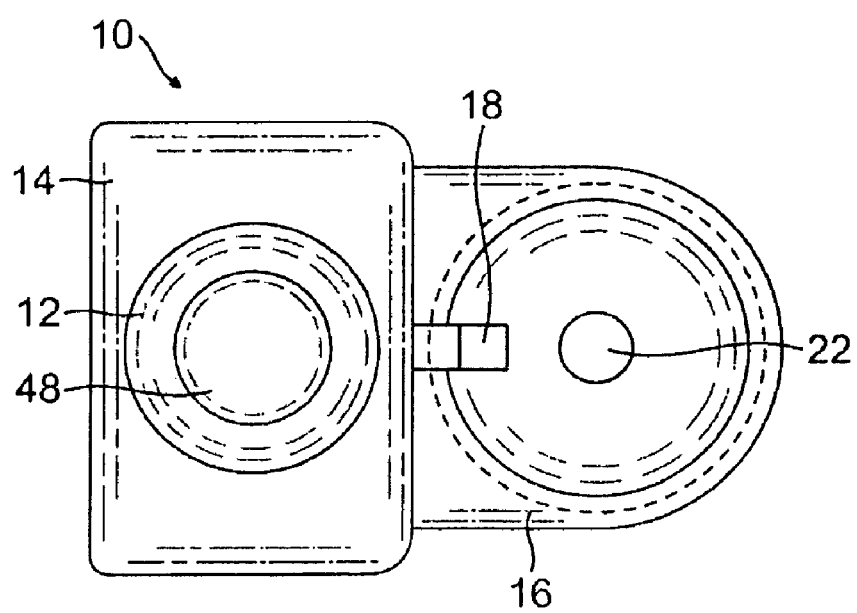
FIG. 2 illustrates a top plan view of the overall invention showing the removable cover, water tank, housing assembly, water fall, water bowl and drain.
Figure 3:
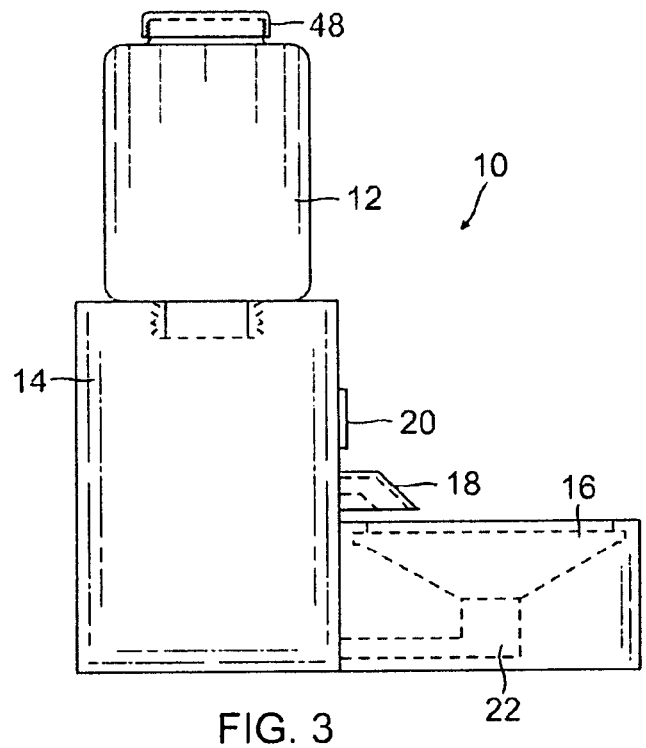
FIG. 3 illustrates a side plan view of the overall invention showing the removable cover, an alternative removable water tank, housing assembly, digital display/controller, water fall, water bowl and drain.
Figure 5:
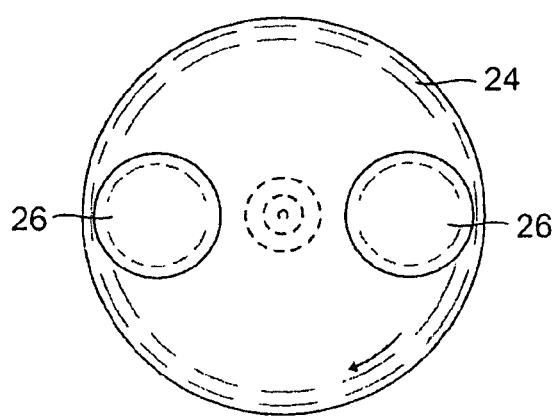
FIG. 5 illustrates a detail view of the drain disc showing the location of the two drain holes.
Figure 4:
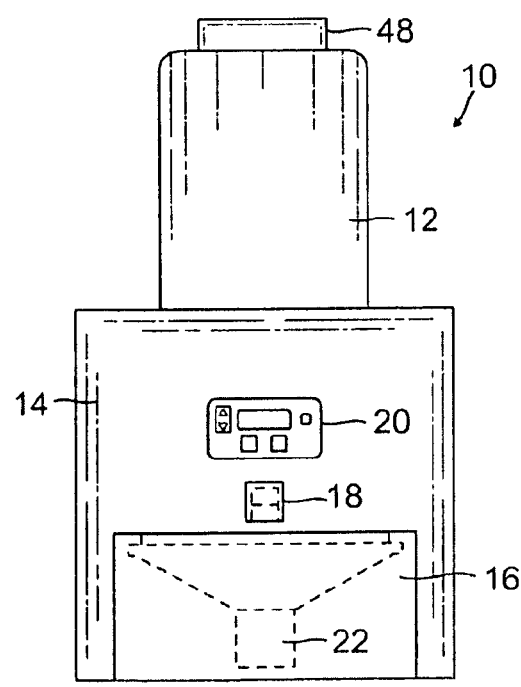
FIG. 4 illustrates a front plan view of the overall invention showing the removable cover, water tank, housing assembly, digital display/controller, water fall, water bowl and drain.
Figure 6:
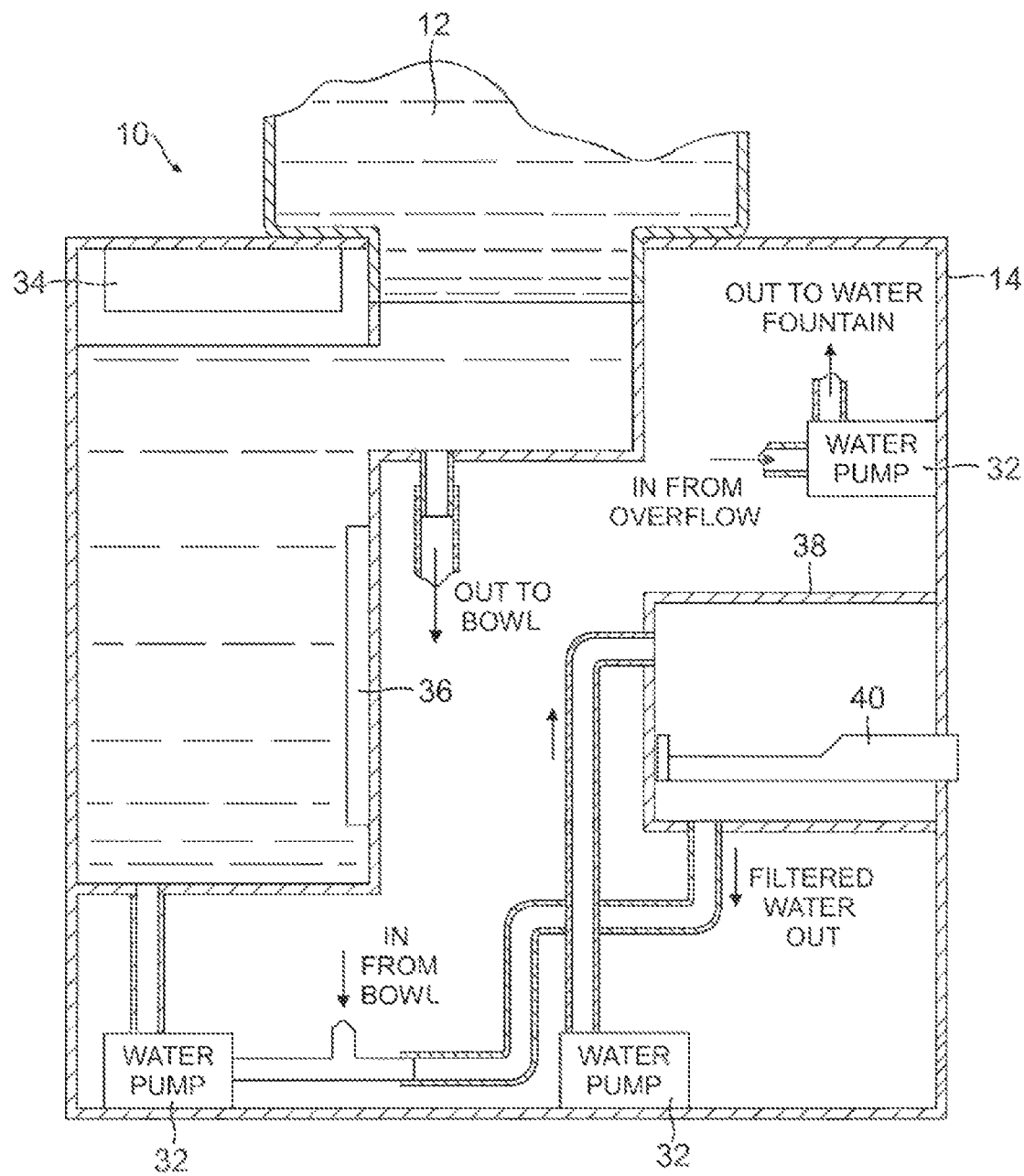
FIG. 6 illustrates a detailed sectional schematic of the housing assembly of the invention showing the water tank, water pumps, filter box, filter clean-out, cooling/heating plate, and water conduit system.
Figure 7:
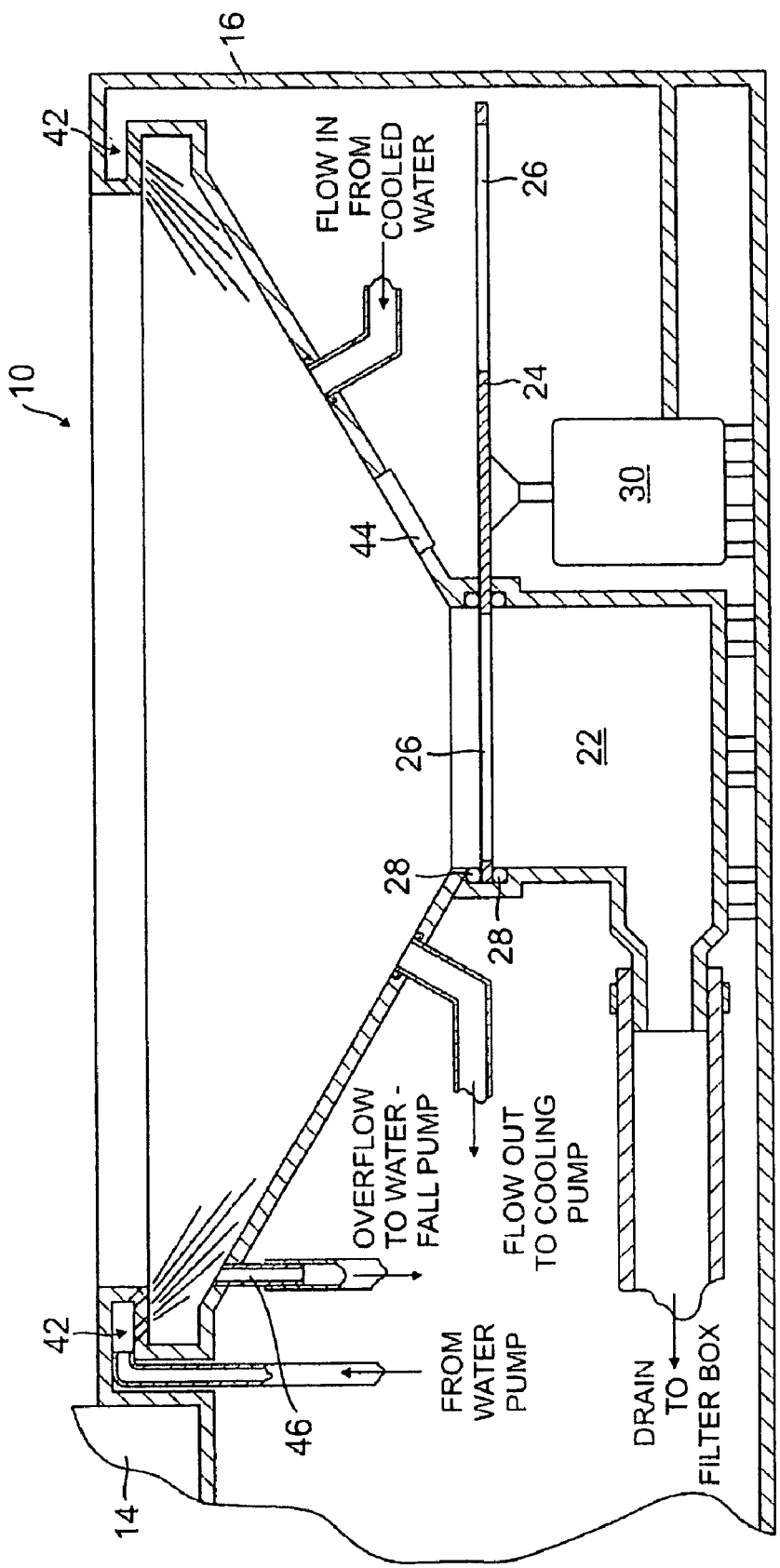
FIG. 7 illustrates a detailed sectional schematic of the water bowl showing the bowl-cleaning water jets, drain, drain seals, drain disc, drain holes in the drain disc, motor, drain, temperature sensor, overflow drain, and a portion of the housing assembly and the water conduit system and the electrical system.

While specific exemplary examples and embodiments are discussed below, it should be understood that this is done for illustration purposes only. A person skilled in the relevant art will recognize that other components and configurations can be used without parting from the spirit and scope of the invention. In fact, after reading the following description, it will become apparent to a person skilled in the relevant art how to implement the invention in alternative examples, environments and embodiments.

In one embodiment, the invention is a refrigerated pet water dispensing and bowl cleaning system that provides cold water for pets at all times while keeping the bowl clean from hair and debris and the overall invention 10 is comprised of the water tank 12 which has a removable cover 48 through which fresh water is added to and thus introduced into the overall invention. The water tank 12 sits on top of the housing assembly 14 and can be unitary with the body of the housing assembly or insertably removable with the body of the housing assembly. Connected to the housing assembly 14 is the water bowl 16. Water fills the water bowl 16 via the water fall 18 and drains back into the system via the drain 22. The overall invention is controlled, run and monitored via the digital display/controller 20. The housing assembly 14 contains a series of water pumps 32 and a filter box 38 that cleans the water of hair and debris. The filter box 38 has a removable filter clean-out 40. The housing assembly also contains a shortwave ultra violet light 34 that kills bacteria and a thermoelectric cooling plate 36 to regulate the temperature of the water. The water bowl 16 houses the motor 30 which controls the drain disc 24. The drain disc 24 has two drain holes 26. As the water needs to be drained from the water bowl 16, the motor 30 activates the drain disc 24 rotating the drain hole 26 into alignment with the drain 22. Once the water bowl 16 is drained, the motor 30 rotates the drain disc 24 until the drain hole 26 is no longer aligned with the drain 22. The drain disc prevents water from leaking into the drain via the drain seals 28. The water bowl 16 also has a temperature sensor 44 and an overflow drain 46. The water bowl 16 is kept clean of hair and debris via the bowl cleaning water jets 42. Using a standard 2.5 liter water bottle which is removably inserted into the overall invention 10 in place of the water tank 12 water goes into the bowl and allows the refrigeration unit to circulate fresh water through the cooling system automatically. Twice a day, at a time chosen by and programmed into the digital display/controller and the underlying integrated circuit 58 by the pet owner, the bowl of the water dispenser drains out and filters hair and debris through a screen that is removable to be cleaned manually. At the same time, another pump turns on and sprays pressurized water against the bowl to clean any remaining residue. That water/residue is also filtered through the filtration system. The left-over water is regenerated through a second filter and is circulated with fresh water and then pumped back into the bowl. The pumps slowly circulate the water 24 hours per day through the refrigeration unit to keep it at a constant cold temperature which is adjustable by a digital thermostat on the control panel which is located on the front of the unit or the inline water heater 62 heats the water to keep the water at the desired constant temperature when the surrounding ambient temperature is deemed too frigid. The overall invention is energized either by a DC charger 50 which is energized by an automobile cigarette lighter jack or a rechargeable battery 52 which is charged by way of a AC/DC converter 56 fed by a 100-250 V input. The water pumps, ultra violet light, thermoelectric cooling plate, cooling/heating plate, car/DC input, DC charger for car or DC input, rechargeable batter, AC input for 100-250 V, AC/DC converter, integrated circuit for the digital display/controller, speaker for music 54, motor, temperature sensor, in-line water heater 62 and the electrical system 66 are all communicatively connected with the integrated circuit 58 so that these various electrical components can be automatically controlled by the digital display/controller which has been programmed by the pet owner. The water conduit system 64 fluidly connects the water pumps, water tank, water bowl, drain, filter box, bowl-cleaning water jets, overflow drain and the in-line water heater to circulate the water inserted into the overall invention and presented to the pet in the water bowl.

Figure 8:
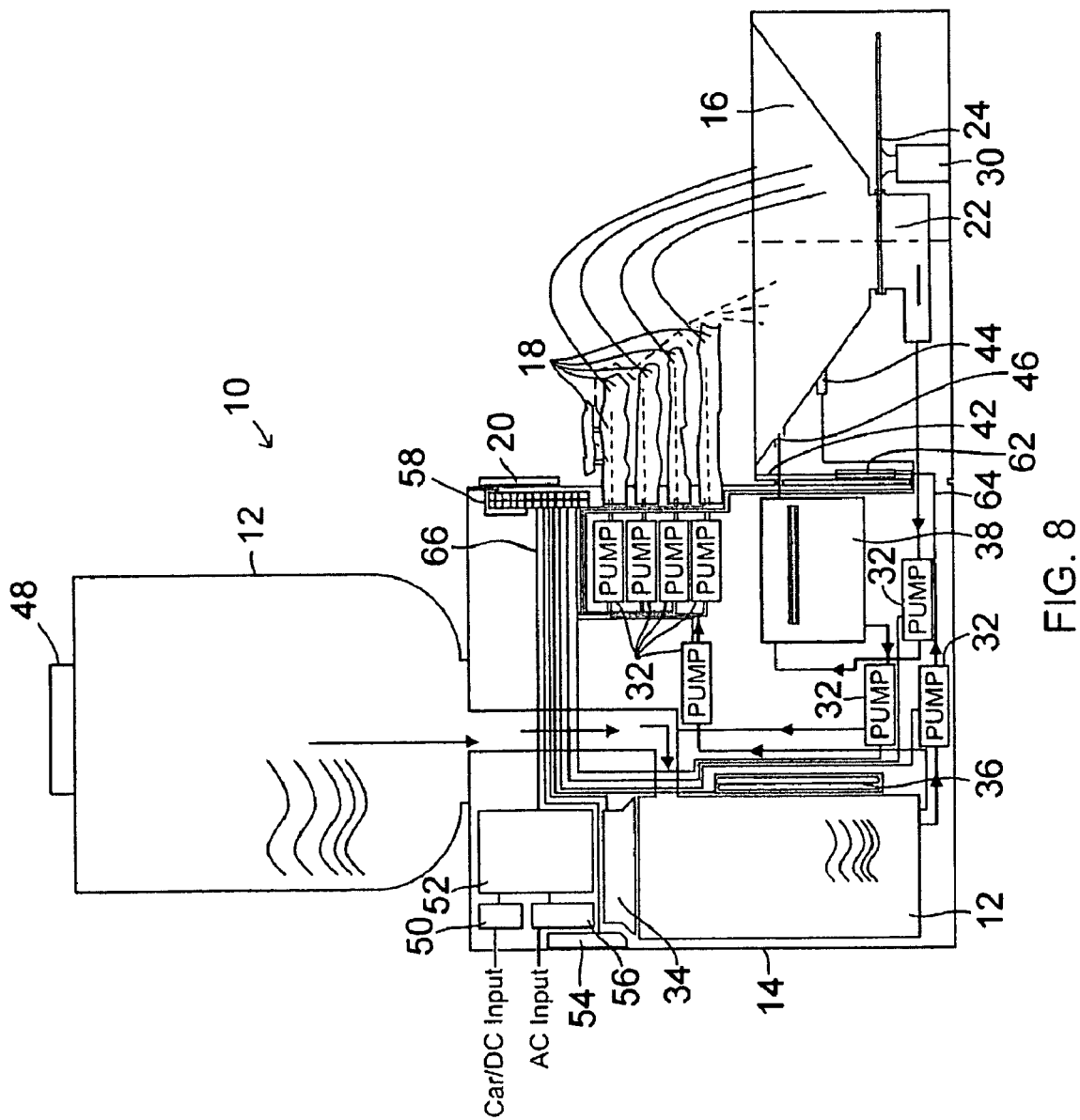
FIG. 8 illustrates a detailed sectional schematic of the overall invention showing the removable cover, water tank, housing assembly, digital display/controller, water fall, water bowl, drain, drain seals, water pumps, ultra violet light, thermoelectric cooling plate, filter box, filter clean-out, car/DC Input, DC charger for car or DC input, rechargeable batter, AC input for 100-250 V, AC/DC converter, integrated circuit for the digital display/controller, speaker for music, bowl-cleaning water jets, drain disc, drain holes, motor, drain, temperature sensor, in-line water heater, overflow drain, water conduit system for circulating the water and the electrical system connecting the integrated circuit with the various electrical components so that the various electrical components can be automatically controlled.

FIG. 8 illustrates a detailed cross sectional schematic diagram view of an exemplary embodiment of a Refrigerated Pet Water Dispensing and Bowl Cleaning System provided in the disclosed embodiment. The respective components thereon are labeled as defined above.

CONCLUSION

While various embodiments of the present invention have been described above, it should be understood that they have been presented by way of example only, and not limitation. Thus, the breadth and scope of the present invention should not be limited by any of the above-described exemplary embodiments, but should instead be defined only in accordance with the following claims and their equivalents.

What is claimed is:

1. A pet water dispensing and bowl cleaning apparatus comprising:
   a water tank, wherein the water tank has a removable cover through which fresh water is added;
   a housing assembly, wherein the water tank is coupled to the housing assembly for introducing water into the apparatus;
   a water bowl positioned within the housing assembly to receive water from the housing assembly;
   a drain at the bottom of the water bowl;
   a drain disc within the housing assembly, wherein the drain disc includes at least one drain hole;
   a motor coupled to the drain disc, wherein the motor operates to rotate the drain disc to an open position by aligning the drain hole with the drain to allow water in the bowl to drain into the housing assembly;
   drain seals surrounding the drain to prevent water in the bowl from leaking into the housing assembly when the drain disc is in a closed position;

at least one pump within the housing assembly used to pump water through a filtration system within the housing assembly, wherein the filtration system is for removing hair and debris from the water and can manually be removed for cleaning; and a water fall, wherein the water fall receives water from the housing assembly through the pump and delivers water to the water bowl.

2. The pet water dispensing and bowl cleaning apparatus of claim 1 further comprising a short wave ultra violet light in the housing assembly used to kill bacteria.

3. The pet water dispensing and bowl cleaning apparatus of claim 1 further comprising a thermoelectric cooling plate within the housing assembly, wherein the thermoelectric cooling plate is in contact with water within the housing assembly to regulate the temperature of the water.

4. The pet water dispensing and bowl cleaning apparatus of claim 1 further comprising a water heater within the housing assembly, wherein the heater is in contact with water within the housing assembly to regulate the temperature of the water.

5. The pet water dispensing and bowl cleaning apparatus of claim 1 further comprising a digital display and controller that includes an integrated circuit to allow a user to regulate the temperature of water within the apparatus and for regulating the time when water is filtered through a filtration system.

6. The pet water dispensing and bowl cleaning apparatus of claim 1 further comprising at least one water jet, wherein the water jet receives water from a water jet pump positioned within the assembly housing, and wherein the water jet is aligned to spray water around the bowl to clean the bowl.

7. The pet water dispensing and bowl cleaning apparatus of claim 1 wherein the water tank is a 2.5 liter water bottle which can be removable inserted into the apparatus.

\* \* \* \* \*